(12) United States Patent
Keusen et al.

(10) Patent No.: US 10,151,260 B2
(45) Date of Patent: Dec. 11, 2018

(54) PROCEDURE AND DEVICE FOR A SWITCHING PRESSURE CALCULATION AT A METERING VALVE

(75) Inventors: Guenter Keusen, Remseck-Pattonville (DE); Damian Dyrbusch, Ludwigsburg (DE); Volker Reusing, Stuttgart (DE); Stefan Stein, Stuttgart (DE)

(73) Assignee: Robert Bosch GMBH, Stuttgart (DE)

( * ) Notice: Subject to any disclaimer, the term of this patent is extended or adjusted under 35 U.S.C. 154(b) by 900 days.

(21) Appl. No.: 12/865,293

(22) PCT Filed: Nov. 11, 2008

(86) PCT No.: PCT/EP2008/065290
§ 371 (c)(1),
(2), (4) Date: Jul. 29, 2010

(87) PCT Pub. No.: WO2009/095105
PCT Pub. Date: Aug. 6, 2009

(65) Prior Publication Data
US 2010/0326056 A1    Dec. 30, 2010

(30) Foreign Application Priority Data

Jan. 29, 2008   (DE) .................. 10 2008 006 568
Mar. 5, 2008    (DE) .................. 10 2008 012 630

(51) Int. Cl.
*F01N 3/025*    (2006.01)
*F01N 9/00*     (2006.01)
(Continued)

(52) U.S. Cl.
CPC ......... *F02D 41/025* (2013.01); *F01N 3/0253* (2013.01); *F01N 3/206* (2013.01);
(Continued)

(58) Field of Classification Search
CPC .............. F01N 3/0253; F01N 2610/03; F01N 2610/14; F01N 2610/146; F01N 3/206;
(Continued)

(56) References Cited

U.S. PATENT DOCUMENTS

| | | | |
|---|---|---|---|
| 5,899,194 A * | 5/1999 | Iwatsuki et al. | 123/527 |
| 7,497,206 B2 | 3/2009 | Kemmer | |

(Continued)

FOREIGN PATENT DOCUMENTS

| | | |
|---|---|---|
| DE | 101 49 982 | 4/2003 |
| DE | 10 2004 031 321 | 1/2006 |

(Continued)

OTHER PUBLICATIONS

Solenoids Basics by Ledex Mar. 21, 2012 (http://w2s.ledex.com/ledx/ds/lx000/1x0002e.lasso?pcode=L451).*
(Continued)

*Primary Examiner* — Brandon Lee
(74) *Attorney, Agent, or Firm* — Norton Rose Fulbright US LLP; Gerard Messina

(57) ABSTRACT

The invention relates to a procedure for a switching pressure calculation at a metering valve of a fuel metering device for metering fuel into an exhaust gas system of a combustion engine with a component that is assigned to the exhaust gas system of the combustion engine for a regeneration, for a temperature impinge and/or for a thermo management, whereby the fuel is injected before this component in streaming direction of the exhaust gas. The invention concerns furthermore a corresponding device for implementing the procedure.

10 Claims, 2 Drawing Sheets

(51) Int. Cl.
*F02D 41/02* (2006.01)
*F01N 3/20* (2006.01)
*F02D 41/20* (2006.01)

(52) U.S. Cl.
CPC ............. *F01N 9/00* (2013.01); *F02D 41/027* (2013.01); *F02D 41/0255* (2013.01); *F02D 41/20* (2013.01); *F01N 2610/03* (2013.01); *F01N 2610/14* (2013.01); *F02D 2041/2065* (2013.01); *F02D 2200/0602* (2013.01); *F02D 2200/503* (2013.01); *Y02A 50/2322* (2018.01); *Y02T 10/26* (2013.01); *Y02T 10/47* (2013.01)

(58) Field of Classification Search
CPC .................. F01N 9/002; F16K 31/002; F02D 2041/2065; F02D 2200/0602
USPC .............................. 123/490; 60/295, 297, 286
See application file for complete search history.

(56) References Cited

U.S. PATENT DOCUMENTS

| | | | | |
|---|---|---|---|---|
| 2001/0020459 | A1* | 9/2001 | Nakamura et al. | 123/90.15 |
| 2002/0157386 | A1* | 10/2002 | Hiranuma et al. | 60/295 |
| 2004/0031263 | A1* | 2/2004 | Binder et al. | 60/286 |
| 2005/0284131 | A1 | 12/2005 | Forthmann et al. | |
| 2006/0207242 | A1* | 9/2006 | Fukumoto et al. | 60/286 |
| 2007/0261392 | A1 | 11/2007 | Wirth et al. | |
| 2009/0044514 | A1* | 2/2009 | Brahma et al. | 60/274 |
| 2009/0255234 | A1 | 10/2009 | Haeberer et al. | |

FOREIGN PATENT DOCUMENTS

| | | |
|---|---|---|
| DE | 10 2004 063 079 | 7/2006 |
| DE | 10 2006 009 921 | 9/2007 |
| DE | 10 2006 057 425 | 11/2007 |
| DE | 10 2006 059 625 | 6/2008 |
| EP | 1 130 227 | 9/2001 |
| EP | 1 582 725 | 10/2005 |
| WO | WO 03/074338 | 9/2003 |
| WO | WO 2008/071533 | 6/2008 |

OTHER PUBLICATIONS

Solenoids Basics by Ledex Apr. 21, 2006 (wayback machine) (http://web.archive.org/web/20060421173416/http://www.ledex.com/basics/basics.html).*

* cited by examiner

PROCEDURE AND DEVICE FOR A SWITCHING PRESSURE CALCULATION AT A METERING VALVE

TECHNICAL FIELD

This application is a National Stage Application of PCT/EP2008/065290, filed 11 Nov. 2008, which claims benefit of Serial No. 10 2008 006 568.4, filed 29 Jan. 2008 in Germany and Serial No. 10 2008 012 630.6, filed 5 Mar. 2008 in Germany and which applications are incorporated herein by reference. To the extent appropriate, a claim of priority is made to each of the above disclosed applications The invention relates to a procedure for a switching pressure calculation at a metering valve of a fuel metering device for metering fuel into an exhaust gas system of a combustion engine with a component that is assigned to the exhaust gas system of the combustion engine for a regeneration, for a temperature impinge and/or for a thermo management, whereby the fuel is injected before this component in streaming direction of the exhaust gas. The invention concerns furthermore a corresponding device for implementing the procedure.

BACKGROUND

Due to currently statutory provisions the particle emission of a combustion engine, in particular a diesel engine, before and/or after a particle filter, as for example a diesel particle filter (DPF), are monitored during the driving operation. Furthermore a load prognosis of the diesel particle filter is required for a regeneration control, in order to achieve a high system security and to be able to use more inexpensive filter material. Furthermore a regulation of the combustion features of the combustion engine can be provided on the basis of the information about the particle emission.

But particle filters provided a limited storage capacity for soot particles and have to be regenerated in certain intervals for restoring the purification effect. A controlling of the regeneration of the particle filter can take place either passively or actively. A high particle load of the filter causes an improperly high increase of the exhaust gas pressure.

In a simply, actively operated procedure a driven distance or an operating time of the combustion engine is usually referred to for the implementation of the regeneration of the filter in firm intervals. That takes place typically every 250 to 1000 km. a soot particle filters the regeneration takes place by an increase of the exhaust gas temperature up to typically 550° C. to 650° C. This can take place by measures in the mixture preparation of the engine or by post-engine measures. Thereby an exothermal reaction is activated, which causes a burn-off of the soot particle and which regenerates the particle filter within a few minutes (for example 20 minutes).

Thus a system is for example known from EP 1130227 A1 for supporting the regeneration of a particle filter that is arranged in an exhaust gas area of a combustion engine, at which the exhaust gas temperature is increased for starting and sustaining the particle regeneration by injecting hydrocarbons (HC) into the exhaust gas area. The increase of the exhaust gas temperature takes basically place by at least one fuel after-injection into the combustion engine, which causes an increased HC-concentration in the exhaust gas, which reacts exothermally in an oxidization catalyzer, which is arranged in streaming direction of the exhaust gas before the particle filter.

DE 102004031321 A1 and DE 102006009921 A1 suggest a procedure for metering a fuel into an exhaust gas duct of a combustion engine and a device for implementing the procedure.

Such a system, at which an accurately metered fuel amount is injected temporarily into the exhaust gas system for the regeneration of the particle filter, is also known under the name DEPARTRONIC and is particularly provided for the use in utility vehicles with diesel engines. The HC-measurement is determined from a period time and a duty cycle for controlling a shut-off valve and a metering valve within a fuel metering device, in order to meter a desired HC-mass flow into the exhaust gas system, whereby the calculated values are send to the corresponding device driver of the shut-off valve and the metering valve.

It has proven to be possibly problematic that the components of the HC-metering device create no autarchic system. The function rather depends for example on the pressure relations in the low-pressure circulation before the shut-off valve or before the metering valve. Furthermore the magnet force cannot suffice anymore for example at a low supply voltage and an increased coil temperature of the metering valve, in order to open the valve against higher difference pressures. A rudimentary diagnosing software would announce in that case a defect metering valve, even though it is technically working properly. Missing or too low heat removals, as for example due to a missing fuel or increased fuel temperature, can furthermore cause an overheating of the magnetic coil, whereby the coil can be destroyed in an extreme case.

It is therefore the task of the invention to establish a procedure, with which a maximally possible switching pressure can be determined at the metering valve, in order to ensure a secure switching of the metering valve, and which comprises only the previously mentioned influences. It is furthermore the task of the invention to provide a corresponding device.

SUMMARY

The task that concerns the procedure is thereby solved, that a maximally switchable pressure that is determined at the metering valve from an actually applied supply voltage and a coil temperature of a magnetic coil of the metering valve, is compared with a difference pressure that is pending above the metering valve and that the metering valve is controlled depending on the result of the comparison. With the procedure an exceeding of the difference pressure over the maximally switchable pressure can be detected. An incorrect system reaction, an undesired error entry, as for example described previously, or a valve damages due to external parameters, as for example a deviating fuel supply pressure or an increased fuel temperature, can be thereby avoided. In particular it can be avoided that the magnet coil is controlled while the heat removal by the fuel is missing. An overheating, which would cause a further magnetic power loss can thereby be avoided.

It is furthermore provided that the metering valve is only opened if the maximally switchable pressure is higher than the pending difference pressure. Thereby a secure metering of fuel can be sustained while avoiding the previously mentioned problems.

In order to be able to predict a temperature increase of the magnetic coil during the fuel metering it is provided, that a power loss of the magnetic coil of the metering valve is determined from a current, which flows through the magnetic coil, and from a duty cycle. A heat removal at the magnetic coil of the metering valve is determined by the fuel temperature. From the power loss of the magnetic coil and the heat removal the temperature as well as a temperature change rate can be derived, with which the dynamic effects can also be considered.

If the dependencies on the power loss of the magnetic coil and on the heat removal are stored in an engine map, the maximally switchable pressure can be relatively easily determined. Furthermore modifications, for example due to an exchange of components or by a subsequent optimization of the parameters can be easily updated by storing new data sets. Also complex functional coherences for example at determination of the heat removal conditions can be simply programmed this way.

One embodiment of the procedure provides that the maximally switchable pressure is lowered at a constant supply voltage with an increasing duty cycle. Thereby the increase of the power loss can be considered with an increasing duty cycle, which would cause a temperature increase at constant conditions—without this measure—and therefore a decreasing of the switching capability of the metering valve.

In another embodiment of the procedure it can be provided that the maximally switchable pressure is lowered at a constant duty cycle at a sinking supply voltage. Thereby an effective and secure metering of the previously determined fuel amount can be also achieved. Both variants that have been described previously are also possible in combination or can be combined with other measures.

It is provided in one procedure variant that the difference pressure is determined by pressure sensors, which are arranged preferably at the metering valve at the in- and outlet.

It is advantageous with regard to a reduction of the constructive effort, if the fuel temperature is determined by a combined pressure/temperature sensor at the inlet or outlet at the metering valve.

A preferred application of the procedure as it has been described previously provides the use in a fuel metering device for a regeneration, for a temperature impingement and/or for a thermo management of a component that is assigned to an exhaust gas system of a combustion engine of motor vehicles, which are operated with diesel fuel. In particular in the area of utility vehicles an effective and flexible regeneration of the particle filter can thereby be ensured and supported.

The task that concerns the device is thereby solved, in that a maximally switchable pressure at a metering valve that can be determined in a control unit as a part of a superior engine control from an actually applied supply voltage and a coil temperature of a magnetic valve of the metering valve, can be compared with a difference pressure that is pending over the metering valve and that the metering valve can be controlled depending on the result of the comparison. The function can thereby be implemented in the superior engine control as software module.

BRIEF DESCRIPTION OF THE DRAWINGS

The invention is further explained in the following by an embodiment that is illustrated in the figures. It shows in.

DETAILED DESCRIPTION

Figure 1:
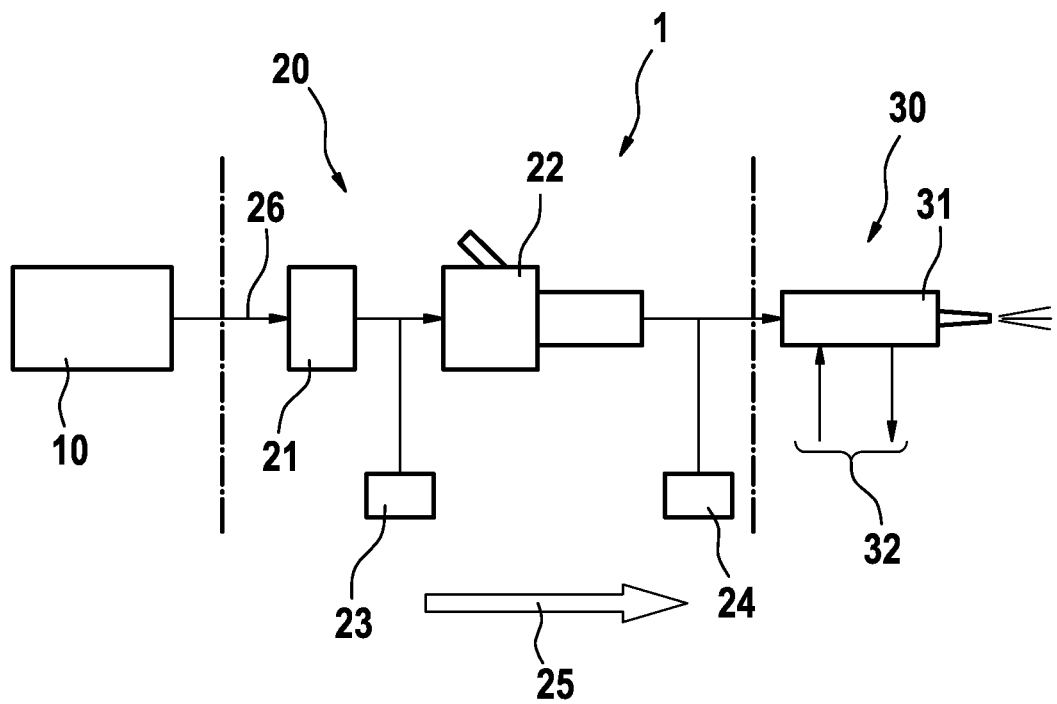
FIG. 1 shows schematically an illustration of a fuel metering device of a combustion engine.

FIG. 1 schematically shows a fuel metering device 1 for regenerating a particle filter in the exhaust gas system of a combustion engine, which can be operated with diesel fuel. The main components provided by the fuel metering device 1 is a low-pressure circulation 10 for the fuel, a fuel metering unit 20 and an injection unit 30, which injects the fuel into the exhaust gas system of the combustion engine in streaming direction of the exhaust gas before the particle filter.

A fuel flow 26 takes place from the low-pressure circulation 10 in the direction of the fuel metering unit 20, which provides a shut-off valve 21 (shut-off valve SV) as well as a metering valve 22 (metering or dosing valve DV). A metering of hydrocarbons (HC) takes place by a temporal control of the shut-off valve 21 and the metering valve 22, whereby the desired HC-mass flow is basically determined from the period time and a duty cycle for controlling the shut-off valve 21 and the metering valve 22. The calculated values are send to the component driver for the shut-off valve 21 and the metering valve 22.

An applied difference pressure 25 over the metering valve 22 is determined in the shown embodiment with the aid of pressure sensors 23, 24, which are arranged at the inlet or outlet at the metering valve 22. For the temperature determination of the fuel the inlet pressure sensor can be construed as combined pressure/temperature sensor 23. The temperature determination is also possible at the outlet at the metering valve 22, for example in the position of the pressure sensor 24.

The injection unit 30 at the exhaust gas system of the combustion engine consists basically of an injection valve 31, which provides a cool water supply or escape 32 for cooling the injection valve 31.

Figure 2:
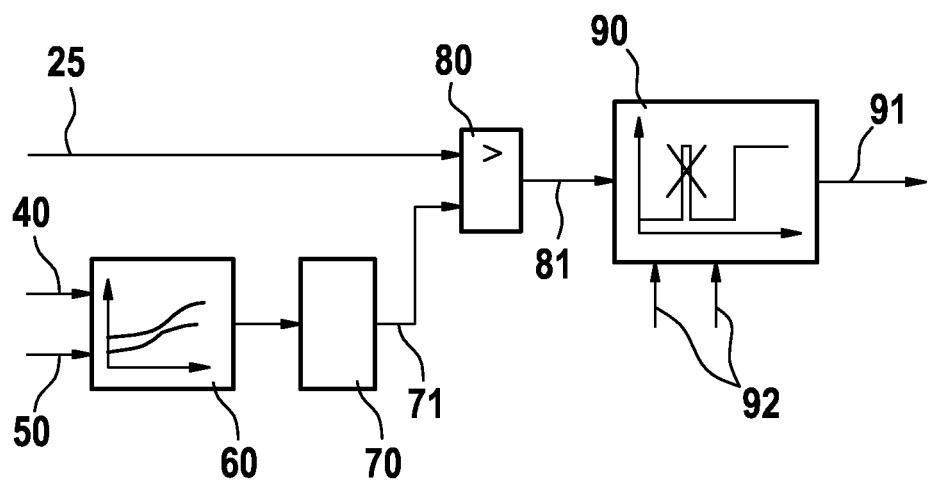
FIG. 2 shows schematically an illustration of the procedure according to the invention and FIG. 3 shows a course of a maximally switchable pressure depending on a duty cycle and a supply voltage of the metering valve.

FIG. 2 shows schematically the course of the process of the procedure according to the invention with the aid of a block diagram.

It is provided according to the invention that a maximally switchable pressure 71 is determined at the metering valve 22 from the actually applied supply voltage 40 and a coil temperature 50 of the magnet coil of the metering valve 22 from FIG. 1, compared to a difference pressure 25 that is pending over the metering valve 22, which can be determined by the pressure sensors 23, 24 (see FIG. 1) and that the metering valve 22 is controlled depending on the result of the comparison.

It is therefore provided that a default is calculated in an engine map unit 60 for a maximally switchable pressure 71, which is provided at the outlet of the engine map unit 60 downstream after the conversion unit 70 from the supply voltage 40 and the coil temperature 50. It is thereby provided in the illustrated embodiment that a power loss of the magnetic coil of the metering valve 22 is determined from a current, which flows through the magnetic coil, and from a duty cycle 100. Furthermore a heat removal at the magnetic coil of the metering valve 22 is determined by the fuel temperature. This calculation can also be implemented in the engine map 60 while considering the input parameters current, duty cycle and fuel temperature, which can for example determined by the combined pressure/temperature sensor 23.

In a comparator unit 80 downstream of the conversion unit 70 the calculated maximally switchable pressure 71 is compared to a difference pressure 25 that is pending over the metering valve 22. A corresponding value is generated as output signal 81 of the comparator unit 80, which causes that the metering valve 22 is only opened if the maximally switchable pressure 71 is higher than the pending difference pressure 25. Previously the output signal 81 is temporally de-bounced in a control unit 90 downstream of the comparator unit 80, so that a temporal control signal for the metering valve 22 is provided as output signal 91 of the control unit 90, which ignores short-term pressure deviations for example in the low-pressure circulation 10 for the fuel. Additionally it can be provided that the output signal 91 of the control unit 90 is additionally influenced with one or several trigger-inputs 92. Cycle signals can be used as signals for the trigger-inputs 92, with which a pulsed fuel injection into the exhaust gas system of the combustion engine can be realized.

The previously mentioned functionality of the procedure can be implemented as hard- and/or software and be at least partially a component of a superior engine control.

In order to ensure a secure switching behavior of the metering valve 22 it is for example provided that the maximally switching pressure 71 is lowered at a constant supply voltage 40 with an increasing duty cycle 100. Additionally the maximally switchable pressure 71 can also be lowered at a constant duty cycle 100 with a sinking supply voltage 40. Both strategies can be implemented in combination or also separated. The parameters for the functional coherences are preferably stored in the engine map unit 60.

Figure 3:
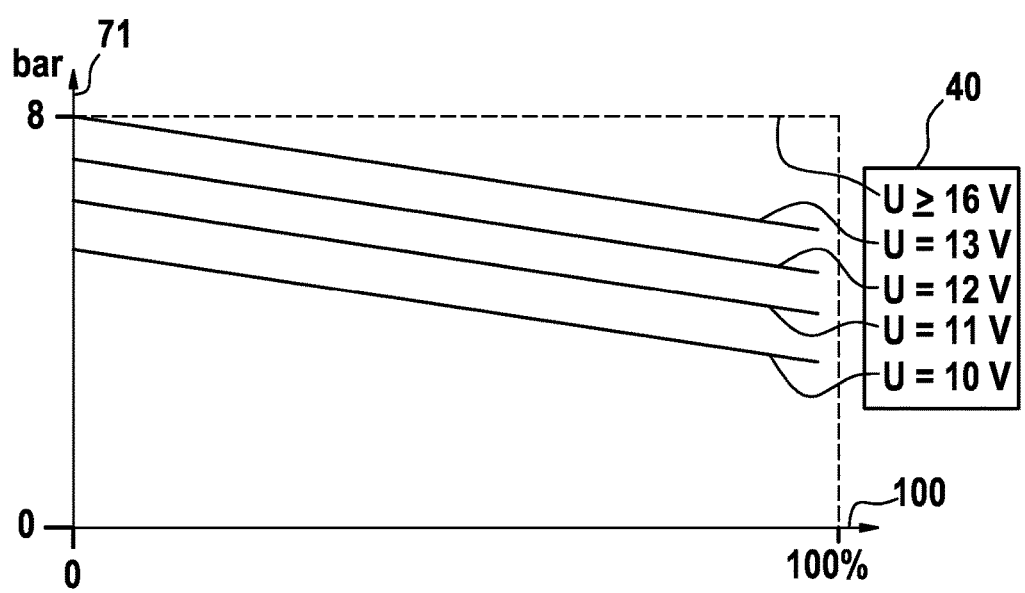

FIG. 3 shows the course of the maximally switchable pressure 71 of the metering valve 22 depending on the duty cycle 100 and the supply voltage 40.

In the shown example at a fuel temperature of maximally 90° C. the maximally switchable pressure 71 amounts at a supply voltage 40≥16 V up to 8 bar and can be sustained up to a duty cycle of 95% at an injection interval of 10 Hz. At a lower supply voltage 40, for example equal or lower 13 V, the maximally switchable pressure 71 sinks with an increasing duty cycle 100 almost linearly, whereby the output value for the maximally switchable value 71 is set correspondingly lower at low duty cycles 100 with a sinking supply voltage 40.

At for example only 10 V supply voltage 40 the maximally switchable pressure 71 amounts at a low duty cycle 100 (>5%) only to 4.5 to 5 bar and sinks with an increasing duty cycle up to 95% to a value of approximately 3 bar. At a supply voltage 40 of 13 V the maximally switchable pressure 71 sinks from approximately 8 bar at a duty cycle of <5% to a value of 5.5 bar at a duty cycle 100 of 95%.

Without referring to it any further the course of the maximally switchable pressure 71 can also be preset depending on other parameters, like the fuel temperature or the current strength through the magnetic coil.

The invention claimed is:

1. A method of controlling a metering valve of a fuel metering device for metering fuel into an exhaust gas system of the combustion engine, the method comprising:
    determining a maximally switchable pressure at the metering valve from a supply voltage present at the metering valve and a coil temperature of a magnetic coil of the metering valve;
    determining an existing difference pressure pending above the metering valve by measuring a first pressure using a first pressure sensor arranged at an inlet of the metering valve; measuring a second pressure using a second pressure sensor arranged at an outlet of the metering valve, and determining the existing pressure difference on the basis of the first pressure and the second pressure;
    comparing the maximally switchable pressure to an existing difference pressure that is pending above the metering valve, wherein the metering valve is controlled depending on a result of the comparison, and
    injecting the fuel before a particular filter in a streaming direction of the exhaust gas, the injecting resulting from physically opening the metering valve when the maximally switchable pressure is higher than the existing difference pressure,
    wherein the particle filter arranged in the exhaust gas system of the combustion engine for a regeneration, a temperature impinge and a thermo management.

2. The method of claim 1, further comprising determining a power loss of the magnetic coil from a current that flows through the magnetic coil and from a duty cycle.

3. The method of claim 1, further comprising determining a heat removal at the magnetic coil by a fuel temperature.

4. The method of claim 3, further comprising storing dependencies on the power loss of the magnetic coil and on the heat removal in an engine map.

5. The method of claim 1, further comprising lowering the maximally switchable pressure at a constant supply voltage with an increasing duty cycle.

6. The method of claim 1, further comprising lowering the maximally switchable pressure at a constant duty cycle with a decreasing supply voltage.

7. The method of claim 1, further comprising determining the existing difference pressure with a plurality of pressure sensors.

8. The method of claim 3, further comprising determining the fuel temperature with a combined pressure/temperature sensor at an inlet or an outlet at the metering valve.

9. The method of claim 1, further comprising operating the combustion engine with a diesel fuel.

10. A control system for metering fuel into an exhaust gas system of a combustion engine, the control system comprising:
    an engine map unit determining a maximally switchable pressure at the metering valve from an applied supply voltage and a coil temperature of a magnetic coil of the metering valve;
    a comparator arranged downstream of the engine map unit and comparing the maximally switchable pressure to an existing difference pressure that is pending above the metering valve, wherein the existing difference pressure is measured by a first pressure sensor arranged at an inlet of the metering valve and a second pressure sensor arranged at an outlet of the metering valve, and wherein the metering valve is controlled depending on a result of the comparison; and
    a control unit arranged downstream of the comparator and opening the metering valve when the maximally switchable pressure is higher than the existing difference pressure, so that the fuel is injected by virtue of the opening of the metering valve and before a particle filter in a streaming direction of the exhaust gas, wherein the particle filter is arranged in the exhaust gas system of the combustion engine for a regeneration, a temperature impinge and a thermo management.

* * * * *